US012266004B2

(12) United States Patent
Ranganathan et al.

(10) Patent No.: US 12,266,004 B2
(45) Date of Patent: Apr. 1, 2025

(54) SYSTEMS AND METHODS FOR PROVIDING CUSTOMER-BEHAVIOR-BASED DYNAMIC ENHANCED ORDER CONVERSION

(71) Applicant: Verizon Patent and Licensing Inc., Basking Ridge, NJ (US)

(72) Inventors: Prakash Ranganathan, Villupuram (IN); Miruna Jayakrishnasamy, Vellore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 274 days.

(21) Appl. No.: 17/932,463

(22) Filed: Sep. 15, 2022

(65) Prior Publication Data
US 2024/0095802 A1 Mar. 21, 2024

(51) Int. Cl.
*G06Q 30/00* (2023.01)
*G06Q 30/0202* (2023.01)
*G06Q 30/0601* (2023.01)

(52) U.S. Cl.
CPC ..... *G06Q 30/0631* (2013.01); *G06Q 30/0202* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 6,904,408 | B1* | 6/2005 | McCarthy | A61B 5/6815 705/2 |
| 7,720,720 | B1* | 5/2010 | Sharma | G06Q 30/02 705/26.7 |
| 10,878,477 | B2* | 12/2020 | Narasimhan | G06Q 30/0243 |
| 11,157,954 | B1* | 10/2021 | Belanger | G06Q 30/0201 |
| 11,188,974 | B2* | 11/2021 | Ramesh | G06Q 20/3265 |
| 2001/0014868 | A1* | 8/2001 | Herz | G06Q 30/02 705/26.1 |

(Continued)

OTHER PUBLICATIONS

Chang, P. (2007). Sifting customers from the clickstream: Behavior pattern discovery in a virtual shopping environment (Order No. 3334386). (Year: 2007).*

(Continued)

*Primary Examiner* — Gurkanwaljit Singh

(57) ABSTRACT

A device may receive dynamic customer data and static customer data, and may calculate additional customer data based on the dynamic customer data and the static customer data. The device may process the static customer data, the dynamic customer data, and the additional customer data, with a first machine learning model, to determine a next action prediction, and may process the static customer data, the dynamic customer data, and the additional customer data, with a second machine learning model, to determine a next sequence prediction. The device may concatenate the static customer data, the dynamic customer data, the additional customer data, the next action prediction, and the next sequence prediction to generate concatenated data, and may process the concatenated data, with a plurality of machine learning models, to calculate various outputs, and may generate a recommendation for the customer based on the various outputs.

20 Claims, 14 Drawing Sheets

(56) References Cited

U.S. PATENT DOCUMENTS

| | | | | |
|---|---|---|---|---|
| 2005/0288954 A1* | 12/2005 | McCarthy | ............... | G06Q 30/02 |
| | | | | 705/2 |
| 2006/0293921 A1* | 12/2006 | McCarthy | ............ | A61B 5/6815 |
| | | | | 705/2 |
| 2007/0250468 A1* | 10/2007 | Pieper | ................. | G06F 16/9535 |
| 2010/0241507 A1* | 9/2010 | Quinn | ................ | G06Q 30/0256 |
| | | | | 705/14.42 |
| 2012/0185354 A1* | 7/2012 | Crucs | ................ | G06Q 30/0631 |
| | | | | 705/26.7 |
| 2013/0132366 A1* | 5/2013 | Pieper | ................... | G06F 16/954 |
| | | | | 707/710 |
| 2014/0040006 A1* | 2/2014 | Balestrieri | ......... | G06Q 30/0631 |
| | | | | 705/14.66 |
| 2016/0162973 A1* | 6/2016 | Lee | .................... | G06Q 30/0255 |
| | | | | 705/26.7 |
| 2017/0004487 A1* | 1/2017 | Hagen | ................ | G06Q 20/4016 |
| 2018/0276710 A1* | 9/2018 | Tietzen | ............... | G06Q 30/0269 |
| 2019/0279281 A1* | 9/2019 | Kumar | ............... | G06Q 30/0631 |
| 2020/0193501 A1* | 6/2020 | Kumar | ............... | G06Q 30/0631 |
| 2020/0394700 A1* | 12/2020 | Koch | ................ | G06Q 30/0641 |
| 2022/0148059 A1* | 5/2022 | Faricy | ................ | G06Q 30/0631 |

OTHER PUBLICATIONS

Xiao, Y. (2018). Recommending best products from E-commerce purchase history and user click behavior data (Order No. 10811015). Available from ProQuest Dissertations and Theses Professional. (2046938439). (Year: 2018).*

Teixeira, Ricardo Filipe Fernandes e Costa Magalhães. (2015). Using clickstream data to analyze online purchase intentions (Order No. 29139257). Available from ProQuest Dissertations and Theses Professional. (2689309911). (Year: 2015).*

* cited by examiner

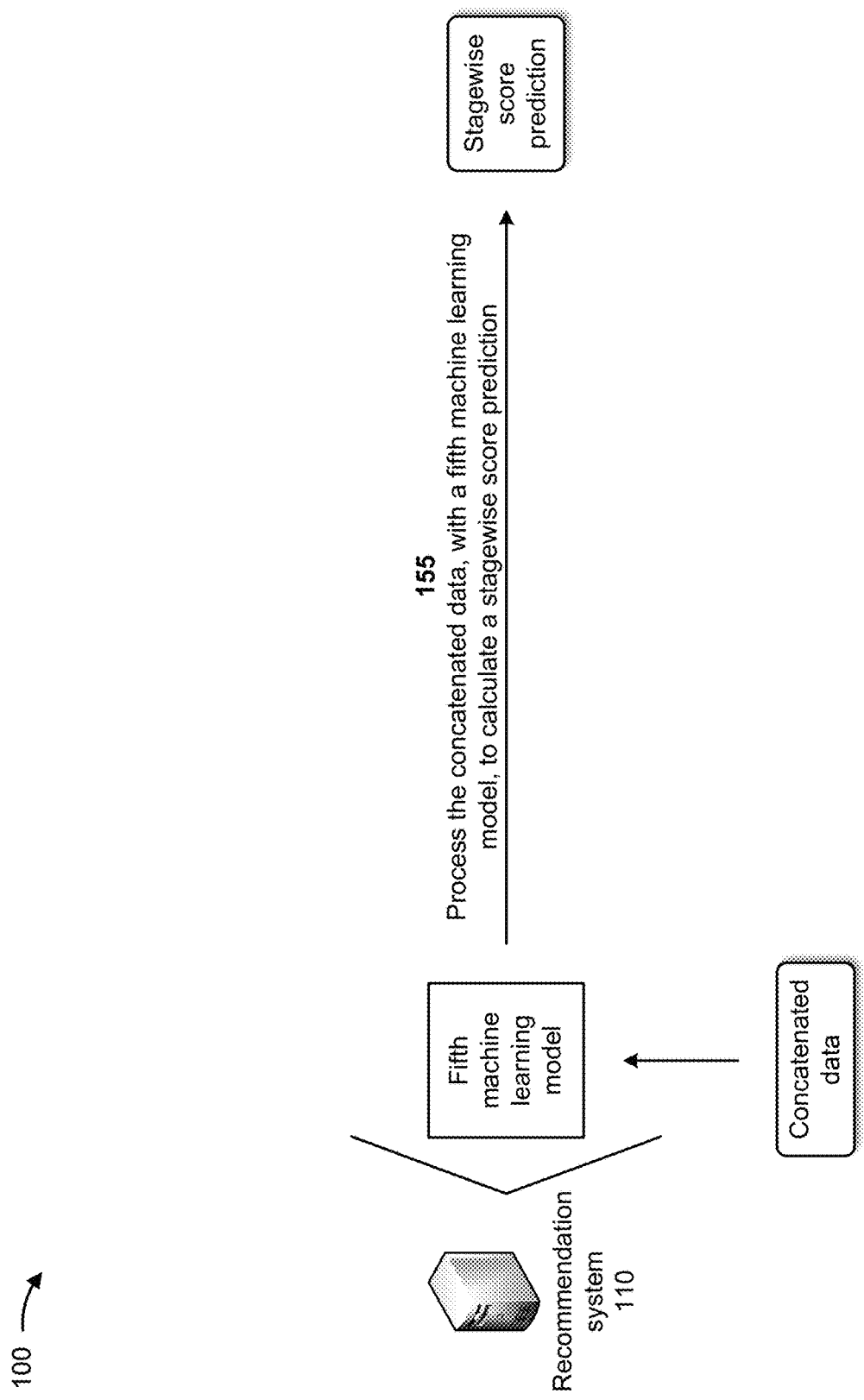

SYSTEMS AND METHODS FOR PROVIDING CUSTOMER-BEHAVIOR-BASED DYNAMIC ENHANCED ORDER CONVERSION

BACKGROUND

The market for online (e.g., e-commerce) transactions has been constantly growing. The share of online retail sales has gradually increased with e-commerce penetration. In the rapidly evolving digital era, every consumer may be assigned to a single segment regardless of social or economic status.

BRIEF DESCRIPTION OF THE DRAWINGS

FIGS. 1A-1J are diagrams of an example associated with providing customer-behavior-based dynamic enhanced order conversion.

DETAILED DESCRIPTION OF EXAMPLE EMBODIMENTS

Figure 1A:
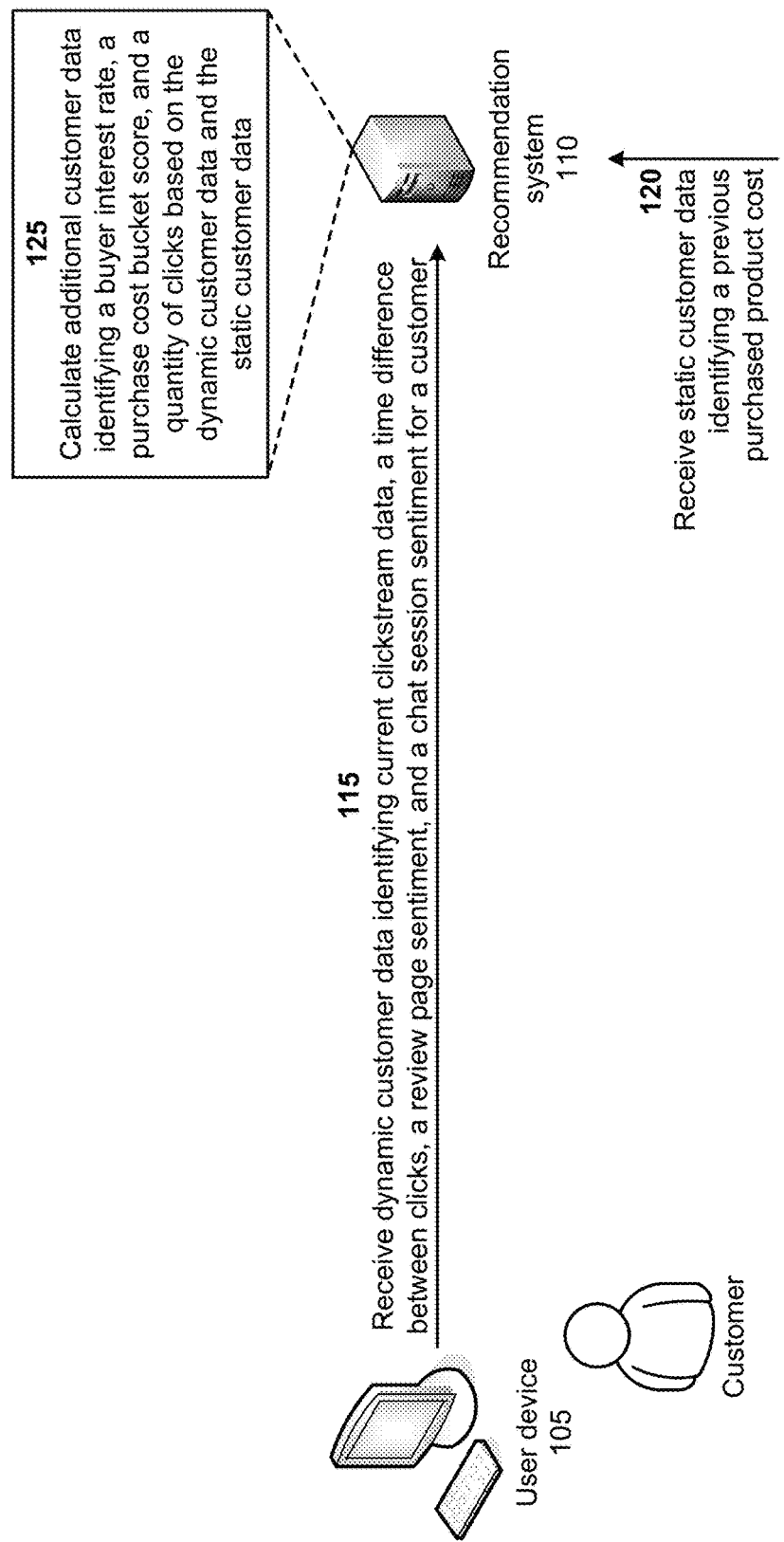

The following detailed description of example implementations refers to the accompanying drawings. The same reference numbers in different drawings may identify the same or similar elements.

To help improve an effectiveness of an e-commerce experience, the problem of analyzing, modeling (e.g., with deep learning models), and predicting a customer's purchase intent has been studied extensively in the industry. However, deep learning models cannot manage an entire sequence of click events (e.g., selections by a customer from a user interface), due to limitations of units assigned to a deep learning layer of the models. Hence, a data scientist utilizing the deep learning models must truncate the data to a certain limit, which results in data loss. Furthermore, the deep learning models fail to consider aspects of a customer purchase journey which are important to complete an order, such as, for example, a buyer interest rate of a product or a service, chat assistance required to complete an order, an impact of reading reviews during an ordering process, and/or the like.

Thus, current techniques for predicting a customer's purchase intent consume computing resources (e.g., processing resources, memory resources, communication resources, and/or the like), networking resources, and/or other resources associated with generating poor predictions of customer purchase intent based on truncating input data, generating poor predictions of customer purchase intent based on failing to consider aspects of a customer journey, providing incorrect recommendations to the customer due to the poor predictions, providing incorrect recommendations to an online purchasing system due to the poor predictions, and/or the like.

Some implementations described herein provide a recommendation system that provides customer-behavior-based dynamic enhanced order conversion. For example, the recommendation system may process dynamic customer data and static customer data, with machine learning models, to generate customer predictions, and may utilize the customer predictions to generate recommendations that help customers to successfully complete orders. In some implementations, the recommendation system may receive dynamic customer data identifying current clickstream data, a time difference between clicks, a review page sentiment, and a chat session sentiment associated with a customer, and static customer data identifying a previous purchased product cost. The recommendation system may calculate additional customer data identifying a buyer interest rate, a purchase cost bucket score, and a quantity of clicks based on the dynamic customer data and the static customer data, and may process the static customer data, the dynamic customer data, and the additional customer data, with a first machine learning model, to determine a next action prediction. The recommendation system may process the static customer data, the dynamic customer data, and the additional customer data, with a second machine learning model, to determine a next sequence prediction, and may concatenate the static customer data, the dynamic customer data, the additional customer data, the next action prediction, and the next sequence prediction to generate concatenated data. The recommendation system may process the concatenated data, with a plurality of machine learning models, to calculate a fallout prediction, an add-cart-and-exit prediction, a stagewise score prediction, a chat assistance flag setting, and a purchase order probability, and may process the fallout prediction, the add-cart-and-exit prediction, the stage-wise score prediction, the chat assistance flag setting, and the purchase order probability, with a recommendation model, to generate a recommendation for the customer. The recommendation system may implement the recommendation for the customer.

In this way, the recommendation system provides customer-behavior-based dynamic enhanced order conversion. For example, the recommendation system may process customer browsing patterns, customer information, sentiment of a chat session, sentiment of review text, a buyer interest rate, a time taken for each click, a purchase cost bucket, and/or the like, with a plurality of machine learning models, to generate a plurality of customer predictions. The recommendation system may utilize the plurality of customer predictions to generate recommendations that help customers to successfully complete orders. The recommendation system may eliminate or reduce the drawback of truncating data in deep learning models by improving model learning with customer sentiment and customer intent. Thus, the recommendation system may conserve computing resources, networking resources, and/or other resources that would have otherwise been consumed by generating poor predictions of customer purchase intent based on truncating input data, generating poor predictions of customer purchase intent based on failing to consider aspects of a customer journey, providing incorrect recommendations to the customer due to the poor predictions, providing incorrect recommendations to an online purchasing system due to the poor predictions, and/or the like.

FIGS. 1A-1J are diagrams of an example 100 associated with providing customer-behavior-based dynamic enhanced order conversion. As shown in FIGS. 1A-1J, example 100 includes a user device 105 associated with a customer and a recommendation system 110. Further details of the user device 105 and the recommendation system 110 are provided elsewhere herein.

As shown in FIG. 1A, and by reference number 115, the recommendation system 110 may receive dynamic customer data identifying current clickstream data, a time difference between clicks, a review page sentiment, and a chat session sentiment associated with a customer. For example, the customer may utilize the user device 105 to generate the current clickstream data associated with an entity offering a service and/or a product on a web page or web pages. The clickstream data may include data collected about a customer while the customer browses through a web page or uses a web browser, data about web pages the customer visits, data about customer behavior while the customer is interacting with a web page, and/or the like. The time difference between clicks may include a time period between when the customer selects an item (e.g., an icon, a hyperlink, a button, and/or the like) on the web page and when the customer selects another item on the web page. The review page sentiment may include a sentiment associated with a review provided by the customer via the web page. The chat session sentiment may include a sentiment associated with a chat session between the customer and an agent of the entity via the web page.

In some implementations, the recommendation system 110 may continuously receive the dynamic customer data from the user device 105 (e.g., or a server device providing the web page to the customer), may periodically receive the dynamic customer data from the user device 105 (e.g., or the server device providing the web page to the customer), may receive the dynamic customer data based on providing a request for the dynamic customer data to the user device 105 (e.g., or the server device providing the web page to the customer), and/or the like.

As further shown in FIG. 1A, and by reference number 120, the recommendation system 110 may receive static customer data identifying a previous purchased product cost. For example, the recommendation system 110 may receive the static customer data identifying the previous purchased product cost from the server device providing the web page to the customer, from another server device associated with the entity, from the user device 105, and/or the like. The previous purchased product cost may include a cost (e.g., in network resource usage, agent time, and/or the like) associated with a product or a service previously purchased by the customer via the web page. For example, the previous purchased product cost may include a cost associated with executing a server that provides the web page to the customer for a time is takes the customer to purchase the product or the service, a cost associated with an agent conducting a chat session with the customer prior to the customer purchasing the product or the service, and/or the like. In some implementations, the recommendation system 110 may periodically receive the static customer data or may receive the static customer data based on requesting the static customer data.

As further shown in FIG. 1A, and by reference number 125, the recommendation system 110 may calculate additional customer data identifying a buyer interest rate, a purchase cost bucket score, and a quantity of clicks based on the dynamic customer data and the static customer data. For example, the recommendation system 110 may filter, from the dynamic customer data and/or the static customer data, click events of a positive flow for the customer that resulted in successful path events (e.g., events associated with the customer selecting a product, adding the product to a cart, updating a delivery address, paying for the product, and completing an order). The positive click events may be referred to as DS1. The recommendation system may filter, from the dynamic customer data and/or the static customer data, click events of a negative flow for the customer that resulted in any combinations of events without the customer placing an order. The negative click events may be referred to as DS2. The recommendation system 110 may retain only alphanumeric characters in each event of the positive click events and the negative click event and may concatenate the positive click events and the negative click events as strings (DS3, where DS3=DS1+DS2).

In some implementations, the recommendation system 110 may derive a sentiment of a chat session between the customer and an agent using a last predetermined percentage (e.g., 25%) of total quantity of sentences for the customer, when the customer initiates the chat during an order process. The chat session sentiment score may be referred to as DS4. The recommendation system 110 may derive a sentiment score (DS5) of a review page that includes a review provided by the customer. If the customer provides multiple reviews, the recommendation system 110 may calculate an average of the sentiment scores for the multiple reviews. In some implementations, the recommendation system 110 may create a vector list (DS6) based on the time difference between clicks provided in the dynamic customer data. In some implementations, the recommendation system 110 may derive features from the dynamic customer data and/or the static customer data (e.g., a user device 105 utilized by the customer, whether the customer logged in to the web page, a session length associated with an interaction with the customer, customer demographic information, and/or the like).

In some implementations, the recommendation system 110 may calculate the buyer interest rate by identifying prominent stages of a purchase by the customer, and calculating a sum (F1) of a quantity of events found between each of the prominent stages. The recommendation system 110 may determine a quantity (F2) of the prominent events identified in a customer visit. The recommendation system 110 may calculate the buyer interest rate (F3) as follows:

$$F3 = \log(F1)/\log(F2/N),$$

where N corresponds to a total quantity of prominent events for the customer.

In some implementations, the recommendation system 110 may calculate the purchase cost bucket score by determining whether it is the customer's first visit to the web page and whether the customer made a previous purchase via the web page. If it is the customer's first visit and the customer did not make a previous purchase, the recommendation system 110 may determine a selected product cost as $c1$, and may calculate a standard deviation (dv) as $0.5 \times c1$. In such an example, a lower bound of the purchase cost bucket score may be $c1+dv$, and an upper bound of the purchase cost bucket score may be $c1-dv$. If the customer has multiple visits to the web page and the customer did not make a previous purchase, the recommendation system 110 may determine the selected product cost $c1$ as an average price of all product pages visited by the customer, and may calculate the standard deviation dv as a standard deviation of the prices of all product pages visited by the customer. In such an example, a lower bound of the purchase cost bucket score may be $c1+dv$, and an upper bound of the purchase cost bucket score may be $c1-dv$. If it is the customer's first visit (or the customer has multiple visits to the web page) and the customer made a previous purchase of multiple products, the recommendation system 110 may determine a purchase cost deviation (PCD) as an average of all previous products' purchased costs. If the customer only purchased one product, the recommendation system 110 may determine the PCD as the price of the previously purchased product, and may calculate a standard deviation (PCDdv) of the prices of all product pages visited by the customer. If N is a threshold limit cost and if PCDdv<N, a lower bound of the purchase cost bucket score may be c1+PCDdv, and an upper bound of the purchase cost bucket score may be c1−PCDdv. If PCDdv>N, c1 may be an average of prices of all product pages visited by the customer, a lower bound of the purchase cost bucket score may be c1+PCDdv, and an upper bound of the purchase cost bucket score may be c1−PCDdv.

In some implementations, the recommendation system 110 may calculate the quantity of clicks (NC) by deriving a path for purchases and determining an average quantity of clicks in each path as {avg1, avg2, avg3, . . . }. The recommendation system 110 may calculate the quantity of clicks based on the standard deviation of the average quantity of the clicks in each path, where NC=stdev(avg1, avg2, avg3 . . . ).

Figure 1B:
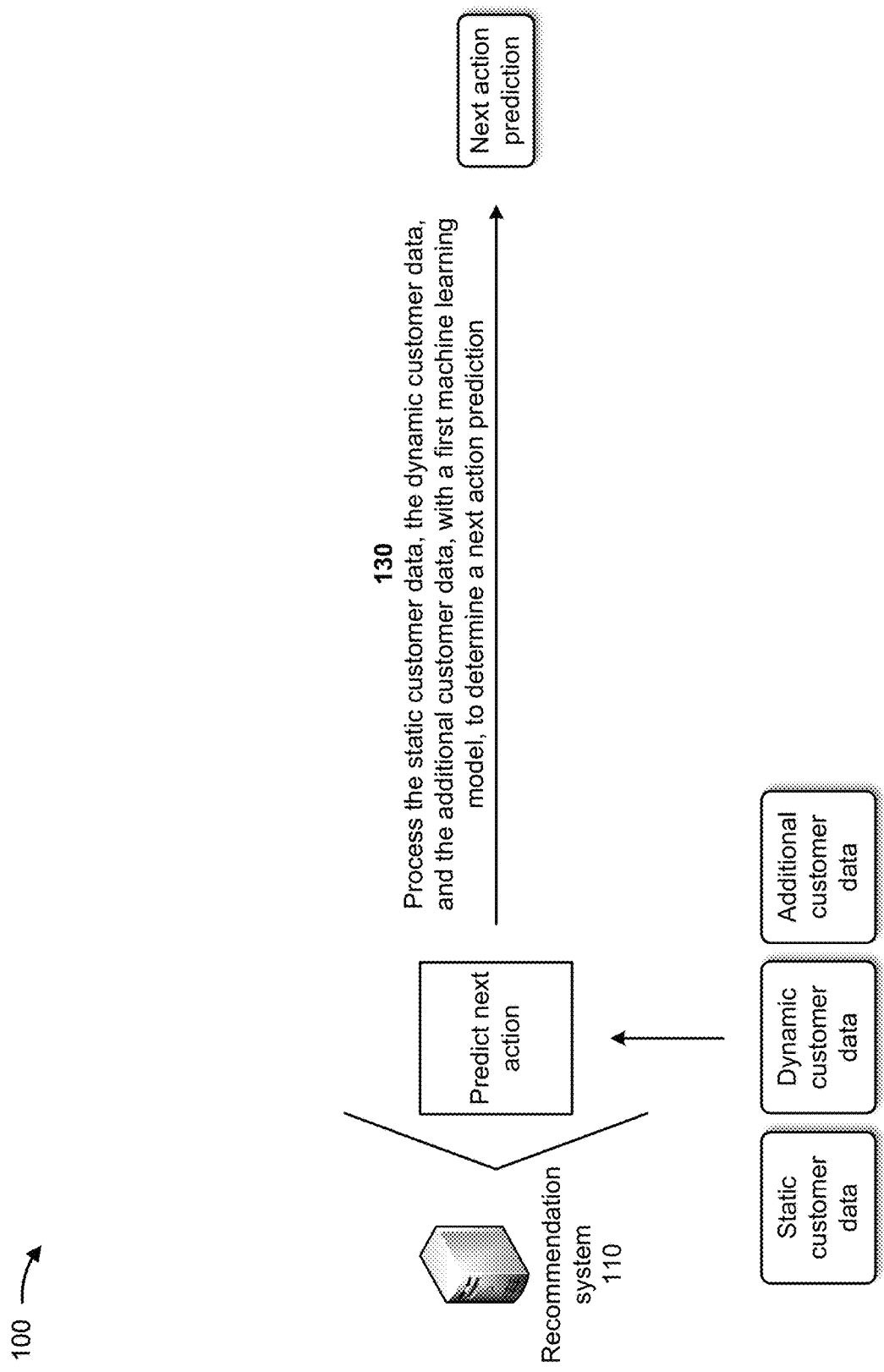

As shown in FIG. 1B, and by reference number 130, the recommendation system 110 may process the static customer data, the dynamic customer data, and the additional customer data, with a first machine learning model, to determine a next action prediction. For example, the first machine learning model may include a first neural network model with a dense layer (e.g., a first long short-term memory (LSTM) layer of three hundred units) and an output layer (e.g., a second LSTM layer of two units). The recommendation system 110 may process the static customer data, the dynamic customer data, and the additional customer data, with the first neural network model, to determine the next action prediction. The next action prediction may include a prediction of a next action (e.g., provide another web page, start a chat session, and/or the like) for the entity (e.g., the web page) to perform for the customer.

Figure 1C:
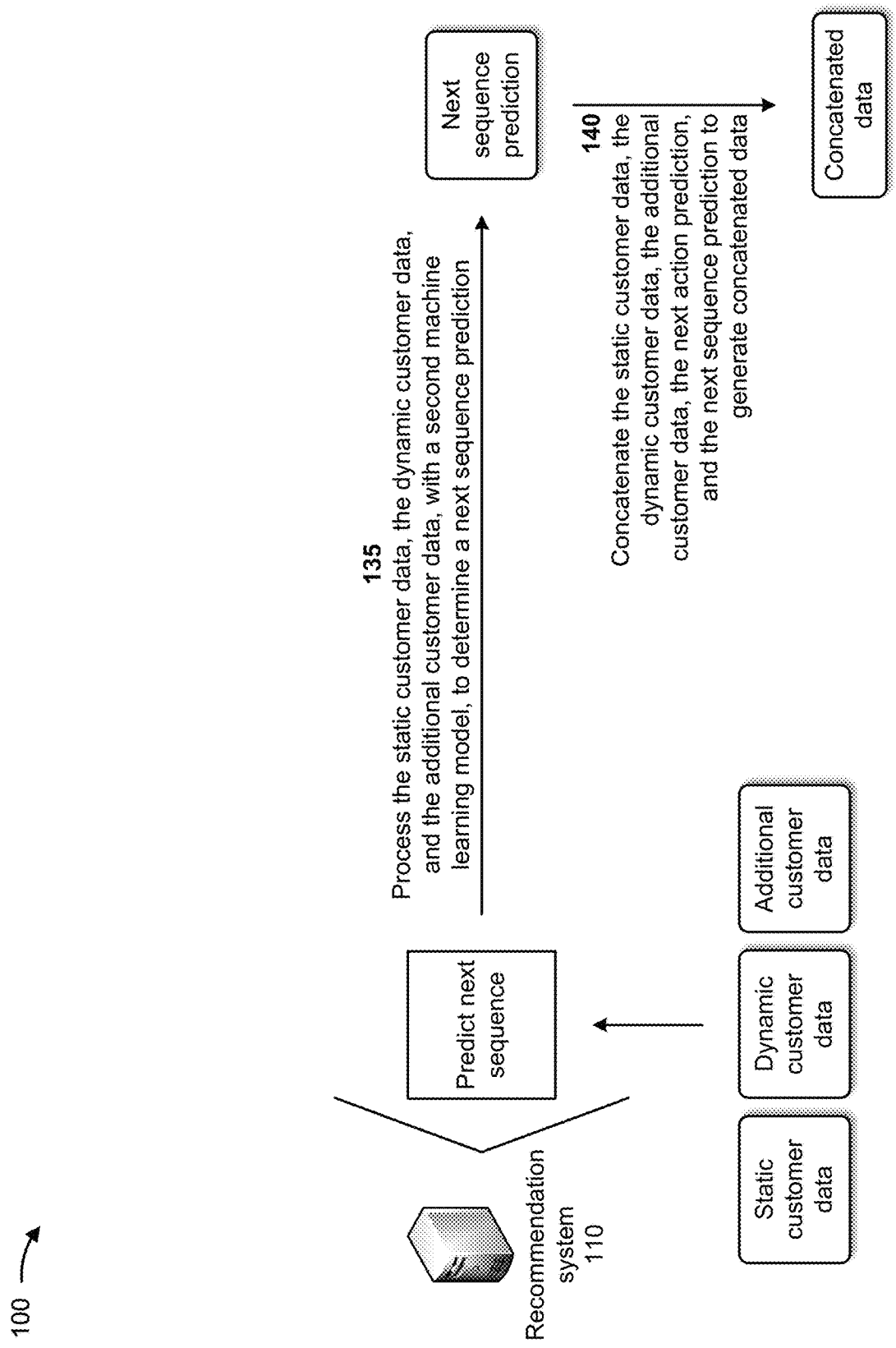

As shown in FIG. 1C, and by reference number 135, the recommendation system 110 may process the static customer data, the dynamic customer data, and the additional customer data, with a second machine learning model, to determine a next sequence prediction. For example, the second machine learning model may include a second neural network model with a dense layer (e.g., a first LSTM layer of one hundred and twenty units) and an output layer (e.g., a second LSTM layer of one hundred units). The recommendation system 110 may process the static customer data, the dynamic customer data, and the additional customer data, with the second neural network model, to determine the next sequence prediction. The next sequence prediction may include a prediction of a next sequence of actions (e.g., provide other web pages and start a chat session, provide an order page followed by a payment page, and/or the like) for the entity (e.g., the web page) to perform for the customer.

As further shown in FIG. 1C, and by reference number 140, the recommendation system 110 may concatenate the static customer data, the dynamic customer data, the additional customer data, the next action prediction, and the next sequence prediction to generate concatenated data. For example, the recommendation system 110 may concatenate the static customer data, the dynamic customer data, the additional customer data, the next action prediction, and the next sequence prediction by combining the static customer data, the dynamic customer data, the additional customer data, the next action prediction, and the next sequence prediction together to generate the concatenated data. In some implementations, the recommendation system 110 may apply different weights to the static customer data, the dynamic customer data, the additional customer data, the next action prediction, and the next sequence prediction to generate weighted static customer data, weighted dynamic customer data, weighted additional customer data, a weighted next action prediction, and a weighted next sequence prediction. In such implementations, the recommendation system 110 may combine the weighted static customer data, the weighted dynamic customer data, the weighted additional customer data, the weighted next action prediction, and the weighted next sequence prediction to generate the concatenated data.

Figure 1D:
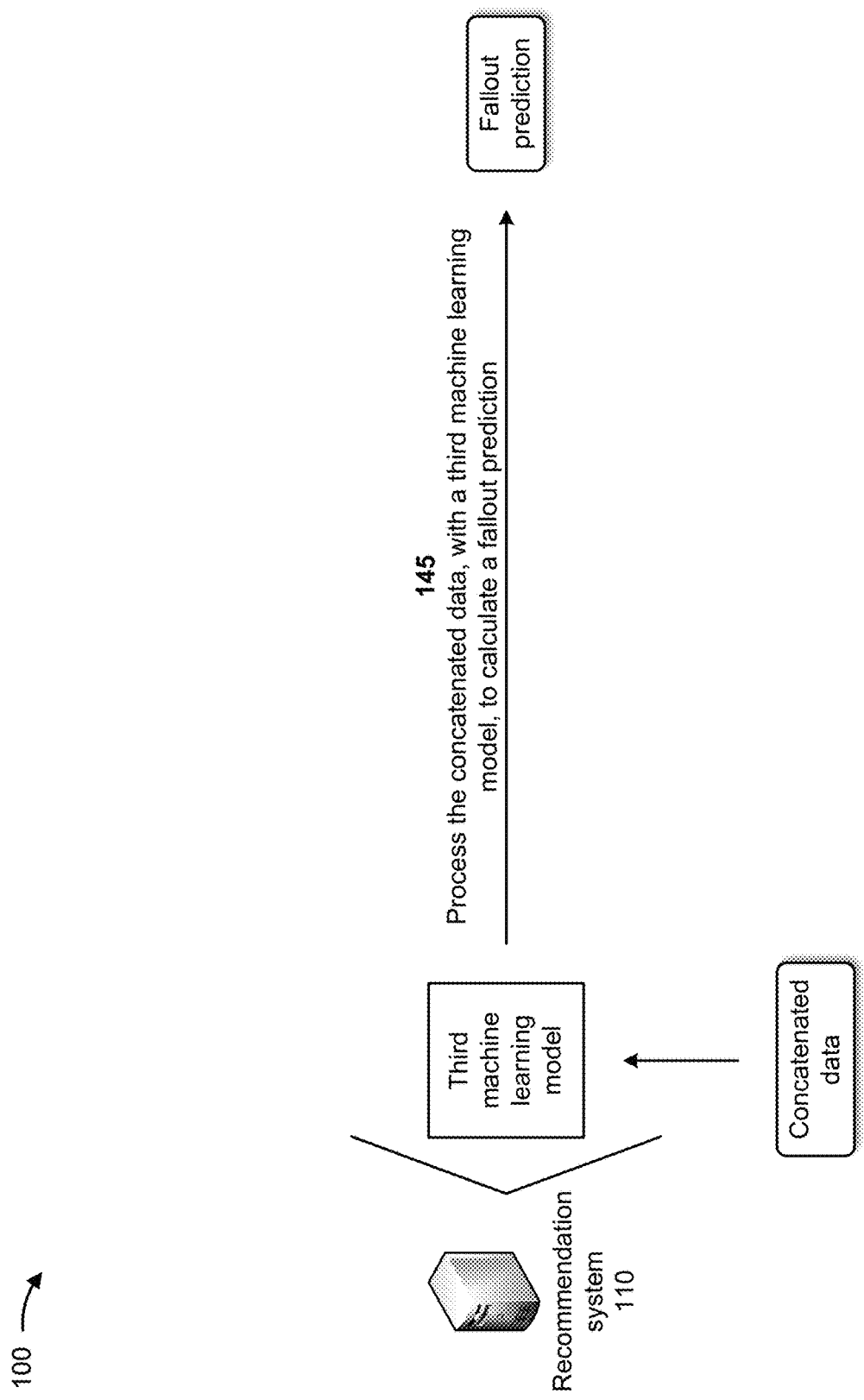

As shown in FIG. 1D, and by reference number 145, the recommendation system 110 may process the concatenated data, with a third machine learning model, to calculate a fallout prediction. For example, the third machine learning model may include a third neural network model with a dense layer (e.g., a first LSTM layer of sixty units) and an output layer (e.g., a second LSTM layer of two units). The recommendation system 110 may process the concatenated data, with the third neural network model, to calculate the fallout prediction. The fallout prediction may include a prediction of a likelihood of the customer exiting the web page without purchasing a product or a service from the entity.

Figure 1E:
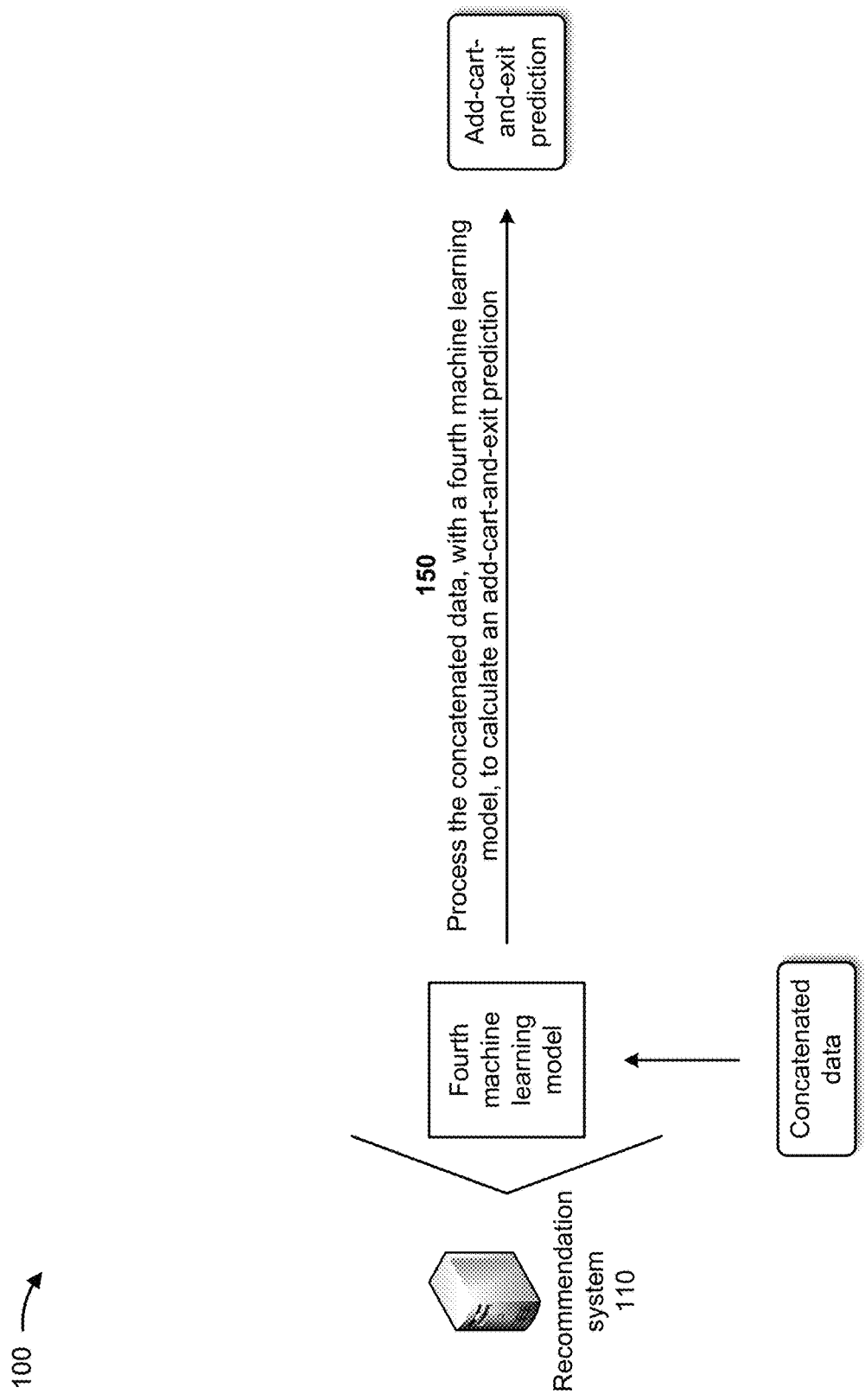

As shown in FIG. 1E, and by reference number 150, the recommendation system 110 may process the concatenated data, with a fourth machine learning model, to calculate an add-cart-and-exit prediction. For example, the fourth machine learning model may include a fourth neural network model with a first dense layer (e.g., a first LSTM layer of sixty units), a second dense layer (e.g., a second LSTM layer of one hundred and twenty units), and an output layer (e.g., a third LSTM layer of two units). The recommendation system 110 may process the concatenated data, with the fourth neural network model, to calculate the add-cart-and-exit prediction. The add-cart-and-exit prediction may include a prediction of a likelihood of the customer adding a product or a service to a shopping cart of the web page and exiting the web page without completing the purchase of the product or the service in the shopping cart.

As shown in FIG. 1F, and by reference number 155, the recommendation system 110 may process the concatenated data, with a fifth machine learning model, to calculate a stagewise score prediction. For example, the fifth machine learning model may include a fifth neural network model with a first LSTM layer (e.g., of three hundred units), a second LSTM layer (e.g., of one hundred and twenty units), and an output layer (e.g., a third LSTM layer of two units). The recommendation system 110 may process the concatenated data, with the fifth neural network model, to calculate the stagewise score prediction. The stagewise score prediction may include a prediction of a next stage of a purchase journey (e.g., for a product or a service) for the entity to present to the customer.

Figure 1G:
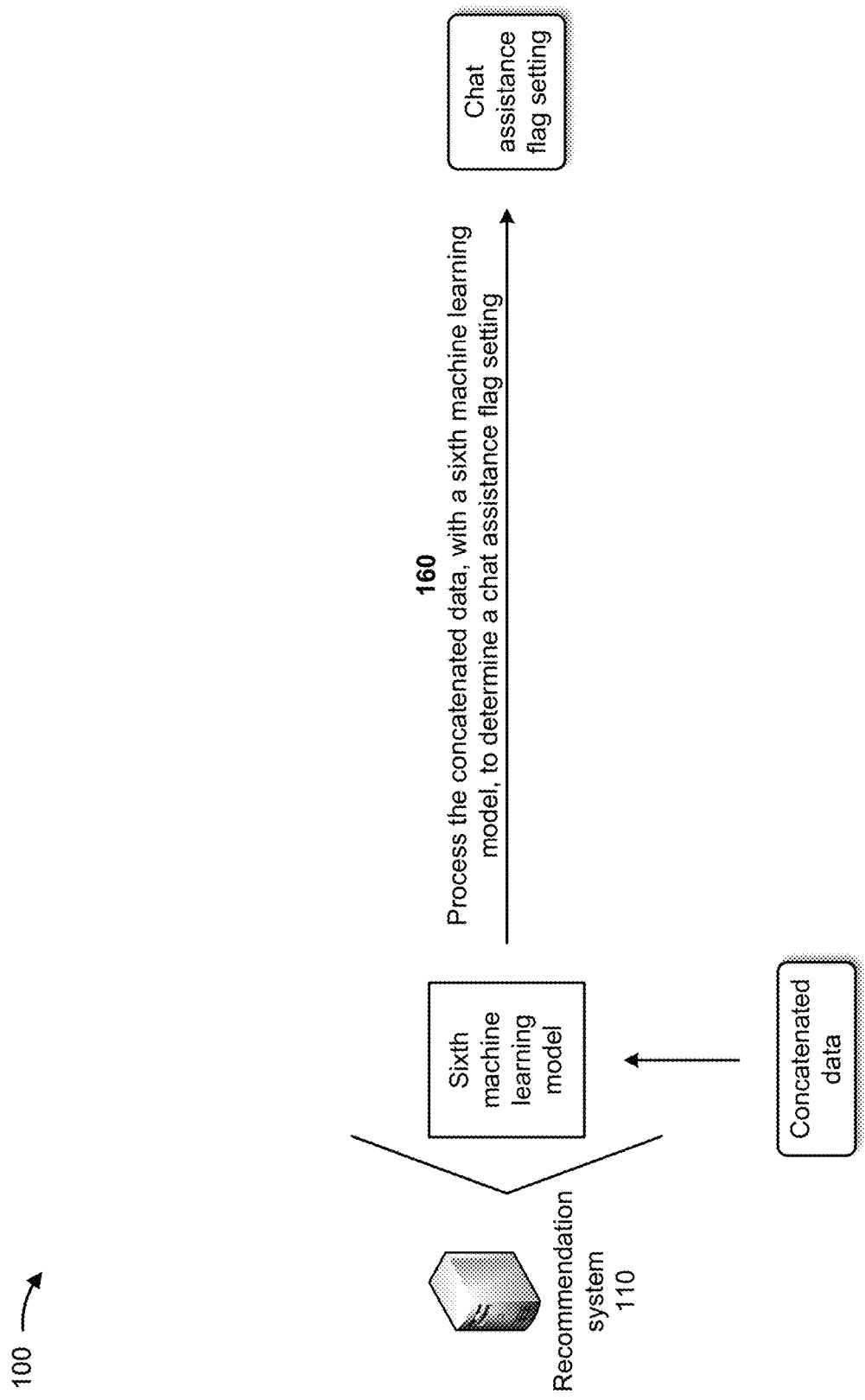

As shown in FIG. 1G, and by reference number 160, the recommendation system 110 may process the concatenated data, with a sixth machine learning model, to determine a chat assistance flag setting. For example, the sixth machine learning model may include a sixth neural network model with a first dense layer (e.g., a first LSTM layer of sixty units), a second dense layer (e.g., a second LSTM layer of one hundred and twenty units), and an output layer (e.g., a third LSTM layer of two units). The recommendation system 110 may process the concatenated data, with the sixth neural network model, to calculate the chat assistance flag setting. The chat assistance flag may be set to zero if the recommendation system 110 determines that a chat session with the customer is unnecessary, and may be set to one if the recommendation system 110 determines that a chat session with the customer is necessary.

Figure 1H:
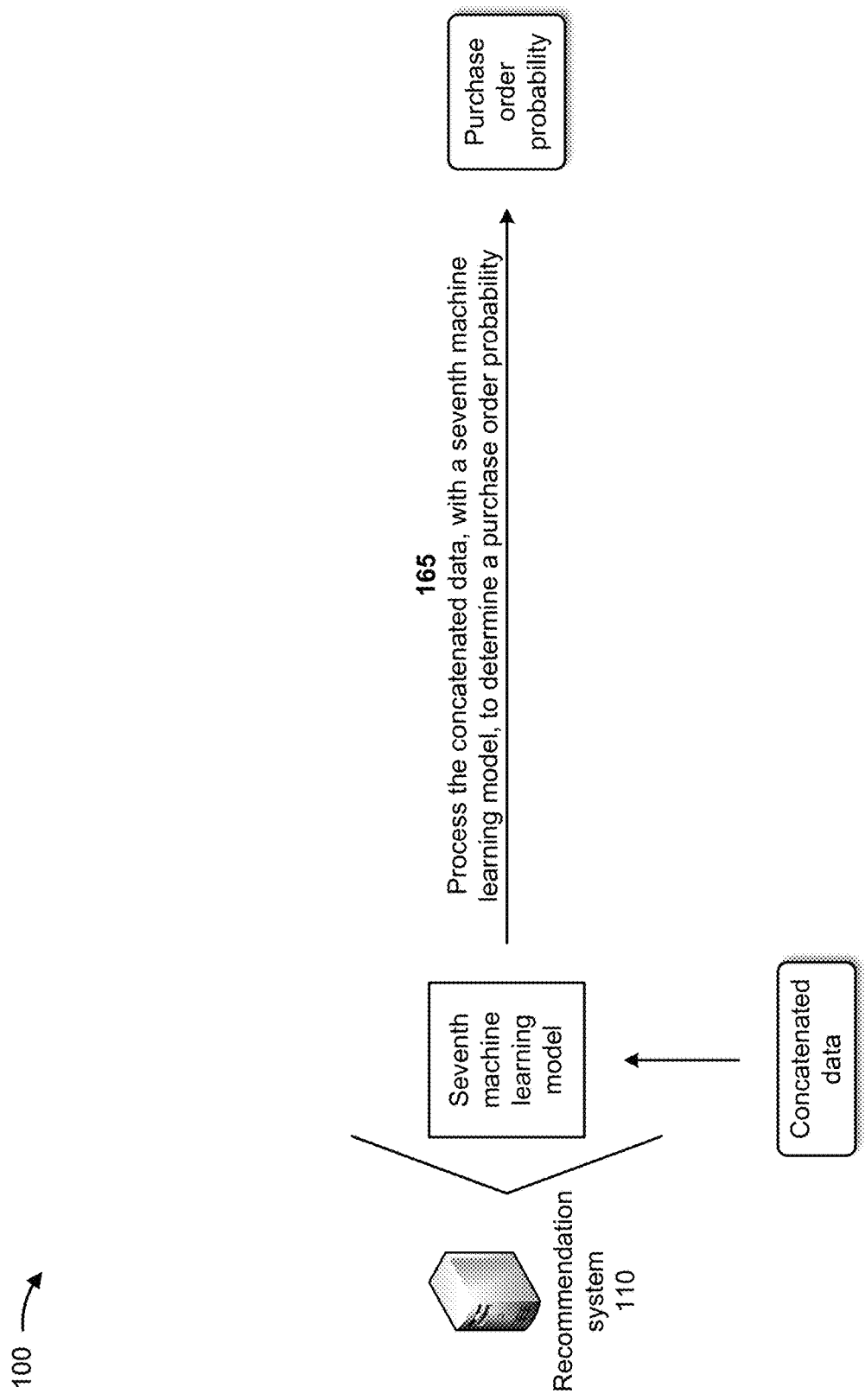

As shown in FIG. 1H, and by reference number 165, the recommendation system 110 may process the concatenated data, with a seventh machine learning model, to determine a purchase order probability. For example, the seventh machine learning model may include a seventh neural network model with a first dense layer (e.g., a first LSTM layer of two hundred and twenty units), a second dense layer (e.g., a second LSTM layer of one hundred and two units), a third dense layer (e.g., a third LSTM layer of sixty-two units), and an output layer (e.g., a fourth LSTM layer of two units). The recommendation system 110 may process the concatenated data, with the seventh neural network model, to calculate the purchase order probability. The purchase order probability may include a probability that the customer will complete a purchase for an order of a product or a service from the entity, via the web page.

Figure 1I:
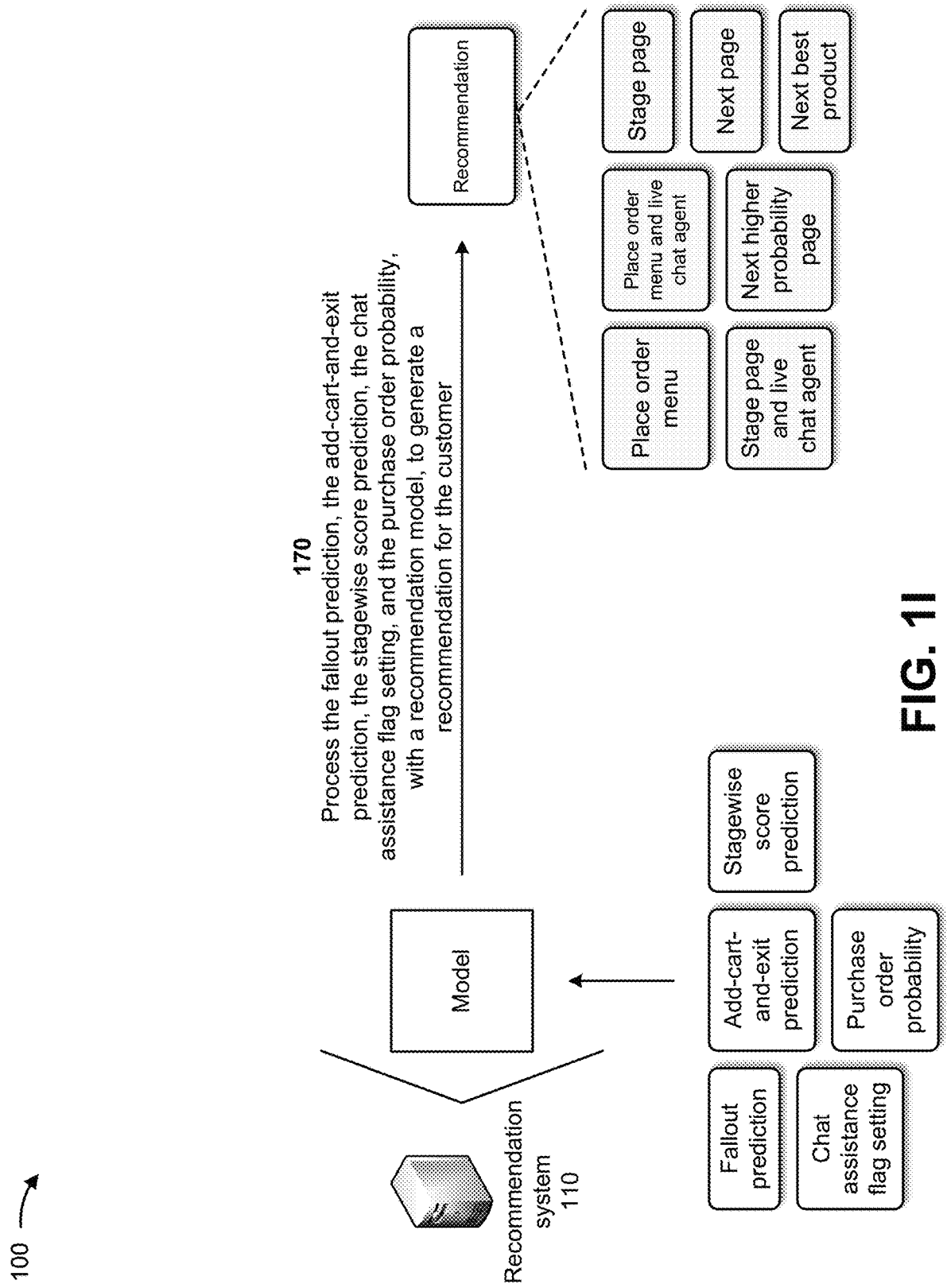

As shown in FIG. 1I, and by reference number 170, the recommendation system 110 may process the fallout prediction, the add-cart-and-exit prediction, the stagewise score prediction, the chat assistance flag setting, and the purchase order probability, with a recommendation model, to generate a recommendation for the customer. In some implementations, when the purchase order probability satisfies a threshold (e.g., is greater than 0.8) and the chat assistance flag setting is zero, the recommendation may be to skip upcoming stages and display a place order menu to the customer. In some implementations, when the purchase order probability satisfies a threshold (e.g., is greater than 0.8) and the chat assistance flag setting is one, the recommendation may be to skip upcoming stages and display a "place order" menu with a live chat agent to the customer.

In some implementations, when the purchase order probability fails to satisfy a first threshold (e.g., is less than 0.8), the buyer interest rate satisfies a second threshold (e.g., is greater than 0.5), the stagewise score prediction satisfies a third threshold (e.g., is greater than 0.5), and the chat assistance flag setting is zero, the recommendation may be to skip upcoming stages and display a staging page to the customer. In some implementations, when the purchase order probability fails to satisfy a first threshold (e.g., is less than 0.8), the buyer interest rate satisfies a second threshold (e.g., is greater than 0.5), the stagewise score prediction satisfies a third threshold (e.g., is greater than 0.5), and the chat assistance flag setting is one, the recommendation may be to skip upcoming stages and display a stage page with a live chat agent to the customer.

In some implementations, when the purchase order probability fails to satisfy a first threshold (e.g., is less than 0.8), the buyer interest rate satisfies a second threshold (e.g., is greater than 0.5), the stagewise score prediction fails to satisfy a third threshold (e.g., is less than 0.5), the fallout prediction satisfies a fourth threshold (e.g., is less than 0.5) or the add-cart-and-exit prediction satisfies a fifth threshold (e.g., is less than 0.5), and the chat assistance flag setting is one, the recommendation may be to display a next higher probability stage page with a live chat agent to the customer. In some implementations, when the purchase order probability fails to satisfy a first threshold (e.g., is less than 0.8), the buyer interest rate satisfies a second threshold (e.g., is greater than 0.5), the stagewise score prediction fails to satisfy a third threshold (e.g., is less than 0.5), the fallout prediction satisfies a fourth threshold (e.g., is less than 0.5) or the add-cart-and-exit prediction satisfies a fifth threshold (e.g., is less than 0.5), and the chat assistance flag setting is zero, the recommendation may be to display a next page to the customer.

In some implementations, when the purchase order probability fails to satisfy a first threshold (e.g., is less than 0.8), the buyer interest rate satisfies a second threshold (e.g., is greater than 0.5), the stagewise score prediction fails to satisfy a third threshold (e.g., is less than 0.5), the fallout prediction fails to satisfy a fourth threshold (e.g., is greater than 0.5), and the add-cart-and-exit prediction fails to satisfy a fifth threshold (e.g., is greater than 0.5), the recommendation may be to display a next page, with an option to navigate for a next best product, to the customer. In some implementations, when the purchase order probability fails to satisfy a first threshold (e.g., is less than 0.8), the buyer interest rate fails to satisfy a second threshold (e.g., is less than 0.5), and the fallout prediction satisfies a third threshold (e.g., is less than 0.5) or the add-cart-and-exit prediction satisfies a fourth threshold (e.g., is less than 0.5), or the quantity of clicks satisfies a fifth threshold, the recommendation may be to display a next best product to the customer.

Figure 1J:
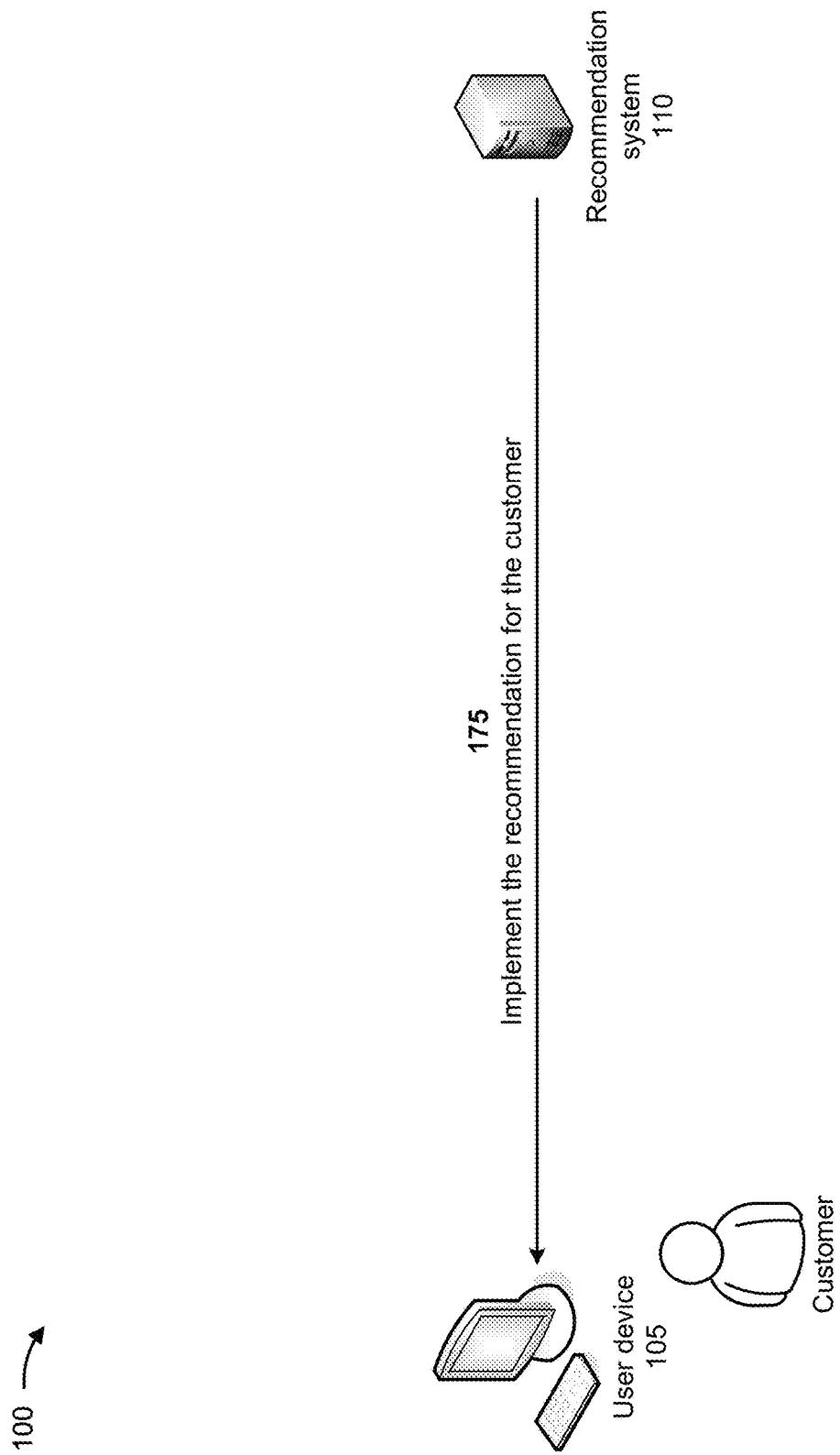

As shown in FIG. 1J, and by reference number 175, the recommendation system 110 may implement the recommendation for the customer. For example, the recommendation system 110 may provide the recommendation to a server device associated with the entity interacting with the customer via the web page. The server device may receive the recommendation, and may implement the recommendation with the customer, via the user device 105.

In this way, the recommendation system 110 provides customer-behavior-based dynamic enhanced order conversion. For example, the recommendation system 110 may process customer browsing patterns, customer information, sentiment of a chat session, sentiment of review text, a buyer interest rate, a time taken for each click, a purchase cost bucket, and/or the like, with a plurality of machine learning models, to generate a plurality of customer predictions. The recommendation system 110 may utilize the plurality of customer predictions to generate recommendations that help customers to successfully complete orders. The recommendation system 110 may eliminate or reduce the drawback of truncating data in deep learning models by improving model learning with customer sentiment and customer intent. Thus, the recommendation system 110 may conserve computing resources, networking resources, and/or other resources that would have otherwise been consumed by generating poor predictions of customer purchase intent based on truncating input data, generating poor predictions of customer purchase intent based on failing to consider aspects of a customer journey, providing incorrect recommendations to the customer due to the poor predictions, providing incorrect recommendations to an online purchasing system due to the poor predictions, and/or the like.

In some implementations, the recommendation system 110 may utilize one or more of the machine learning models described herein to calculate one or more of the fallout prediction, the add-cart-and-exit prediction, the stagewise score prediction, the chat assistance flag setting, or the purchase order probability. The recommendation system 110 may calculate the recommendation for the customer based on the one or more of the fallout prediction, the add-cart-and-exit prediction, the stagewise score prediction, the chat assistance flag setting, or the purchase order probability.

As indicated above, FIGS. 1A-1J are provided as an example. Other examples may differ from what is described with regard to FIGS. 1A-1J. The number and arrangement of devices shown in FIGS. 1A-1J are provided as an example.

In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
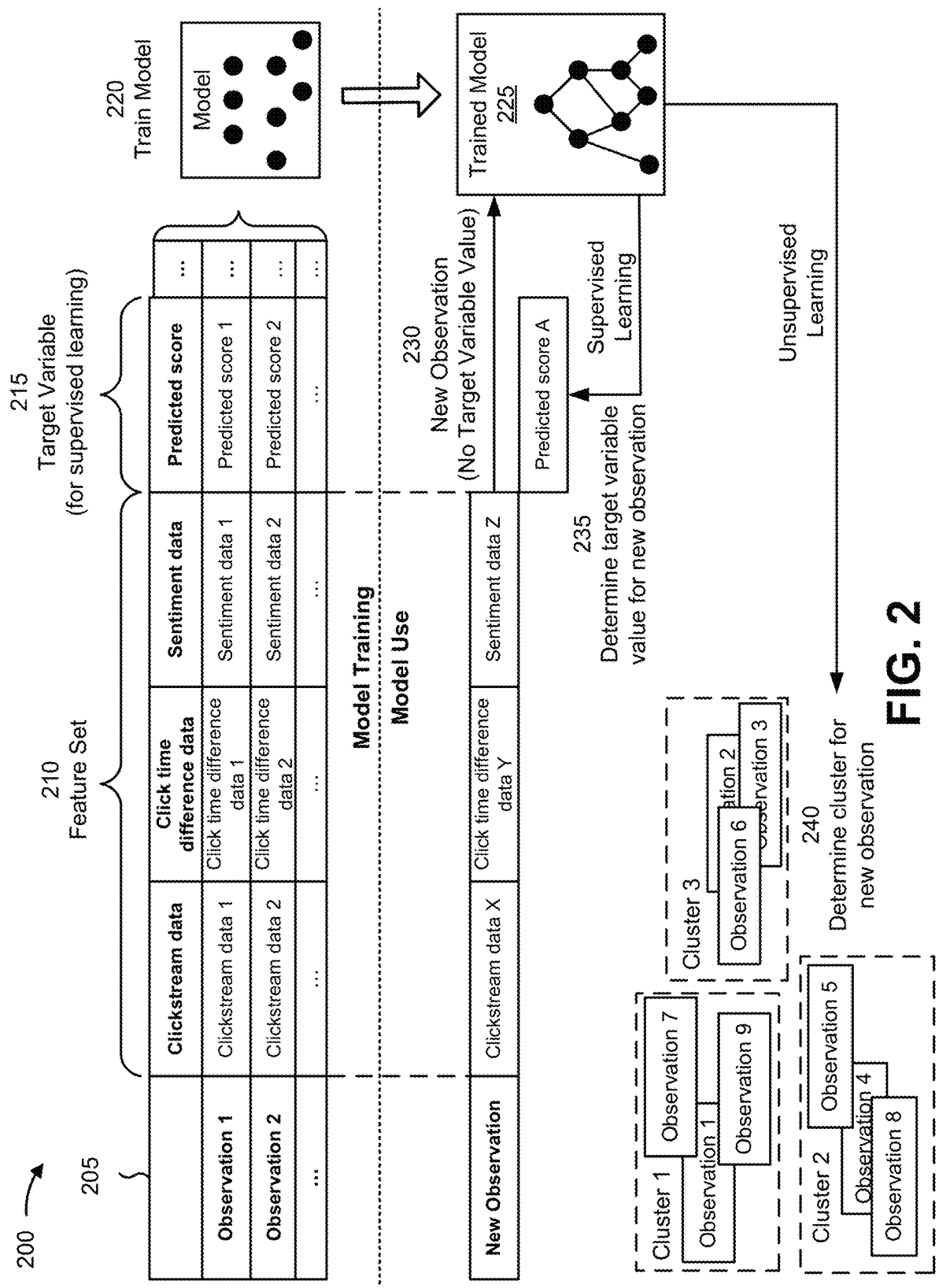
FIG. 2 is a diagram illustrating an example of training and using a machine learning model.

FIG. 2 is a diagram illustrating an example 200 of training and using a machine learning model provide customer-behavior-based dynamic enhanced order conversion. The machine learning model training and usage described herein may be performed using a machine learning system. The machine learning system may include or may be included in a computing device, a server, a cloud computing environment, and/or the like, such as the recommendation system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the recommendation system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the recommendation system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of clickstream data, a second feature of click time difference data, a third feature of sentiment data, and so on. As shown, for a first observation, the first feature may have a value of clickstream data 1, the second feature may have a value of click time difference data 1, the third feature may have a value of sentiment data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled "predicted score" and may include a value of predicted score 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of clickstream data X, a second feature of click time difference data Y, a third feature of sentiment data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of predicted score A for the target variable of the predicted score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a clickstream data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a click time difference data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to provide customer-behavior-based dynamic enhanced order conversion. The machine learning system enables recognition and/or identification of tens, hundreds, thousands, or millions of features and/or feature values for tens, hundreds, thousands, or millions of observations, thereby increasing accuracy and consistency and reducing delay associated with providing customer-behavior-based dynamic enhanced order conversion relative to requiring computing resources to be allocated for tens, hundreds, or thousands of operators to manually provide customer-behavior-based dynamic enhanced order conversion.

As indicated above, FIG. 2 is provided as an example. Other examples may differ from what is described in connection with FIG. 2.

Figure 3:
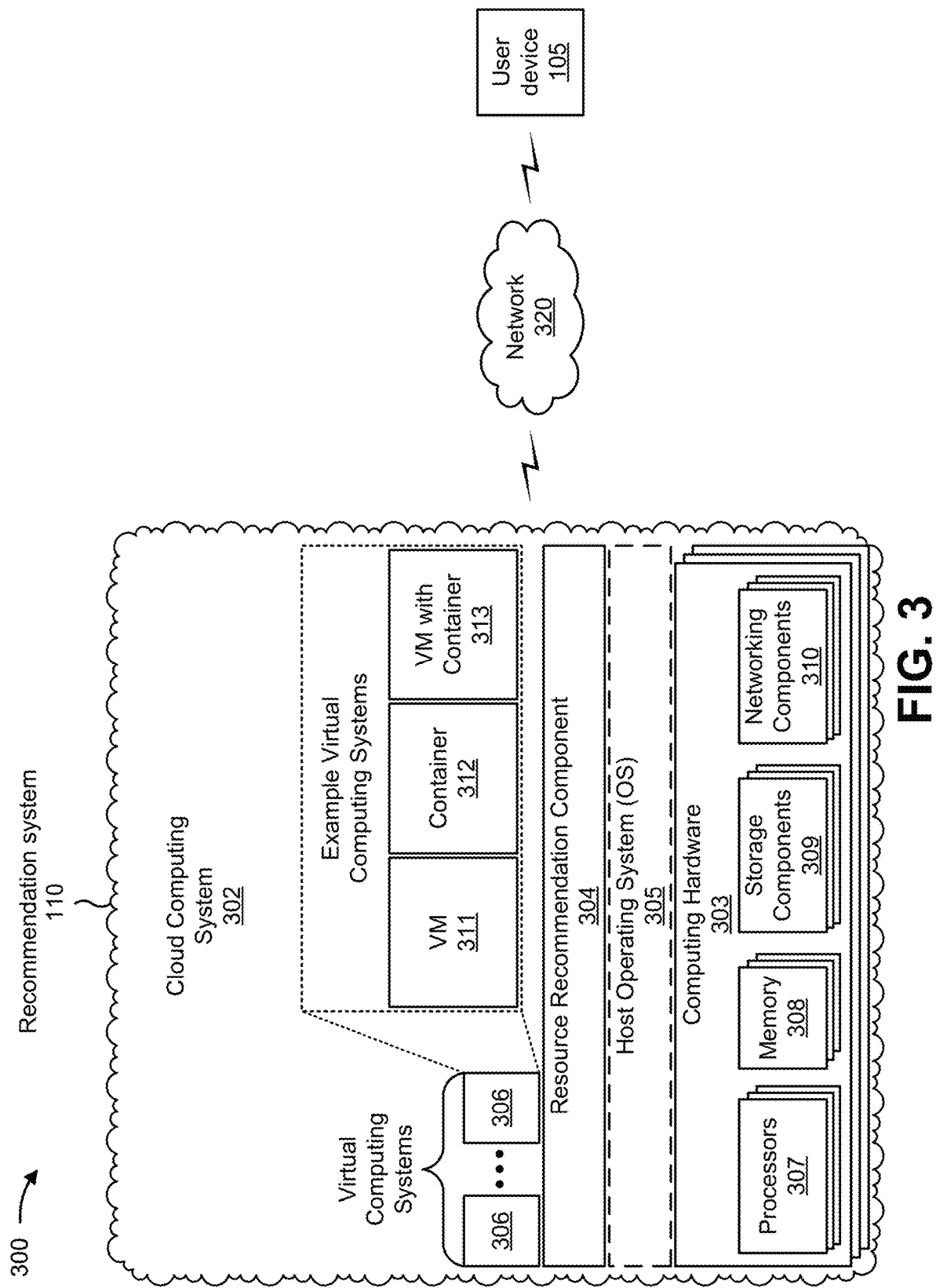
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the recommendation system 110, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the recommendation system 110 may include one or more elements 303-313 of the cloud computing system 302, may execute within the cloud computing system 302, and/or may be hosted within the cloud computing system 302, in some implementations, the recommendation system 110 may not be cloud-based (e.g., may be implemented outside of a cloud computing system) or may be partially cloud-based. For example, the recommendation system 110 may include one or more devices that are not part of the cloud computing system 302, such as the device 400 of FIG. 4, which may include a standalone server or another type of computing device. The recommendation system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
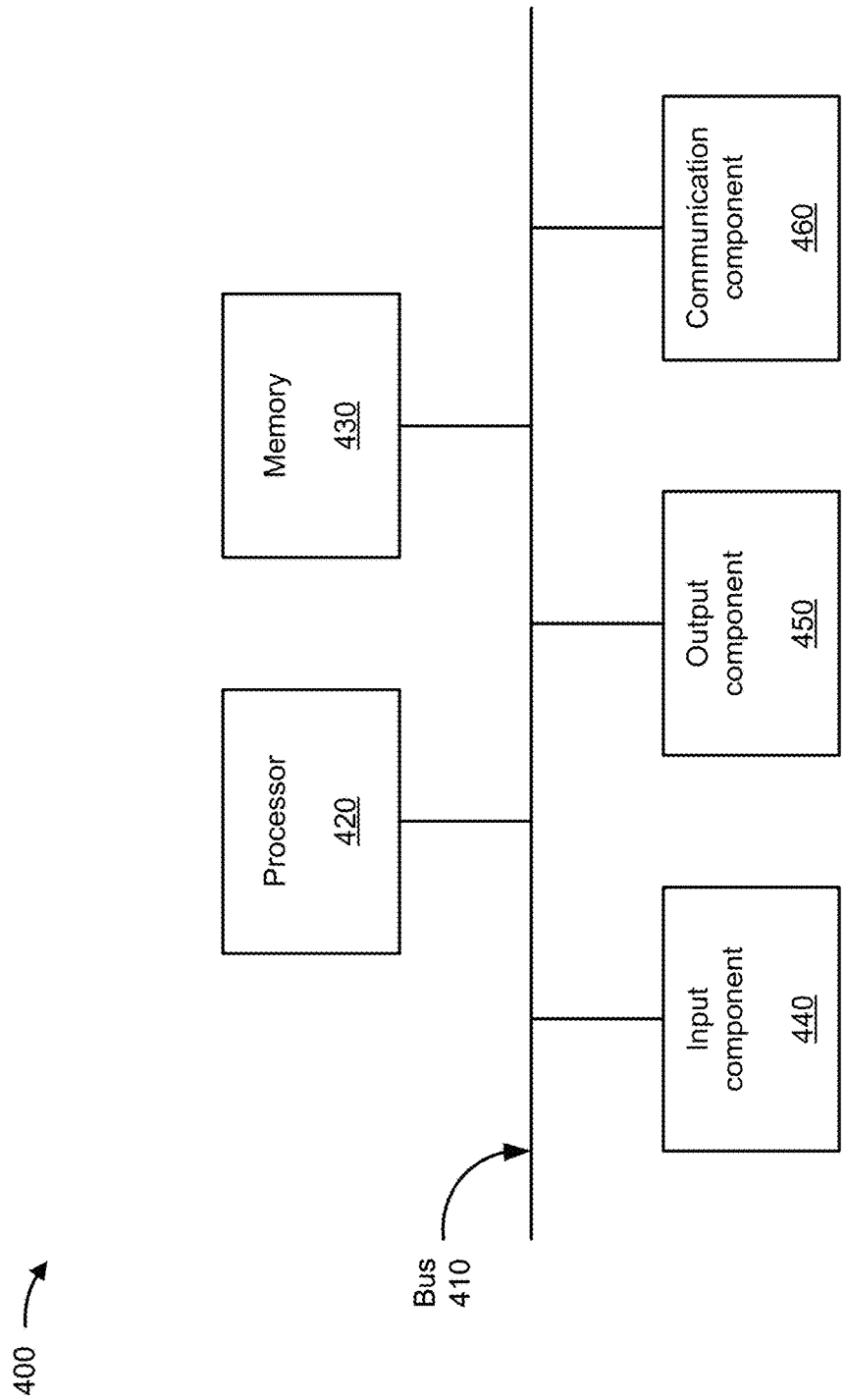
FIG. 4 is a diagram of example components of one or more devices of FIG. 3.

FIG. 4 is a diagram of example components of a device 400, which may correspond to the user device 105 and/or the recommendation system 110. In some implementations, the user device 105 and/or the recommendation system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
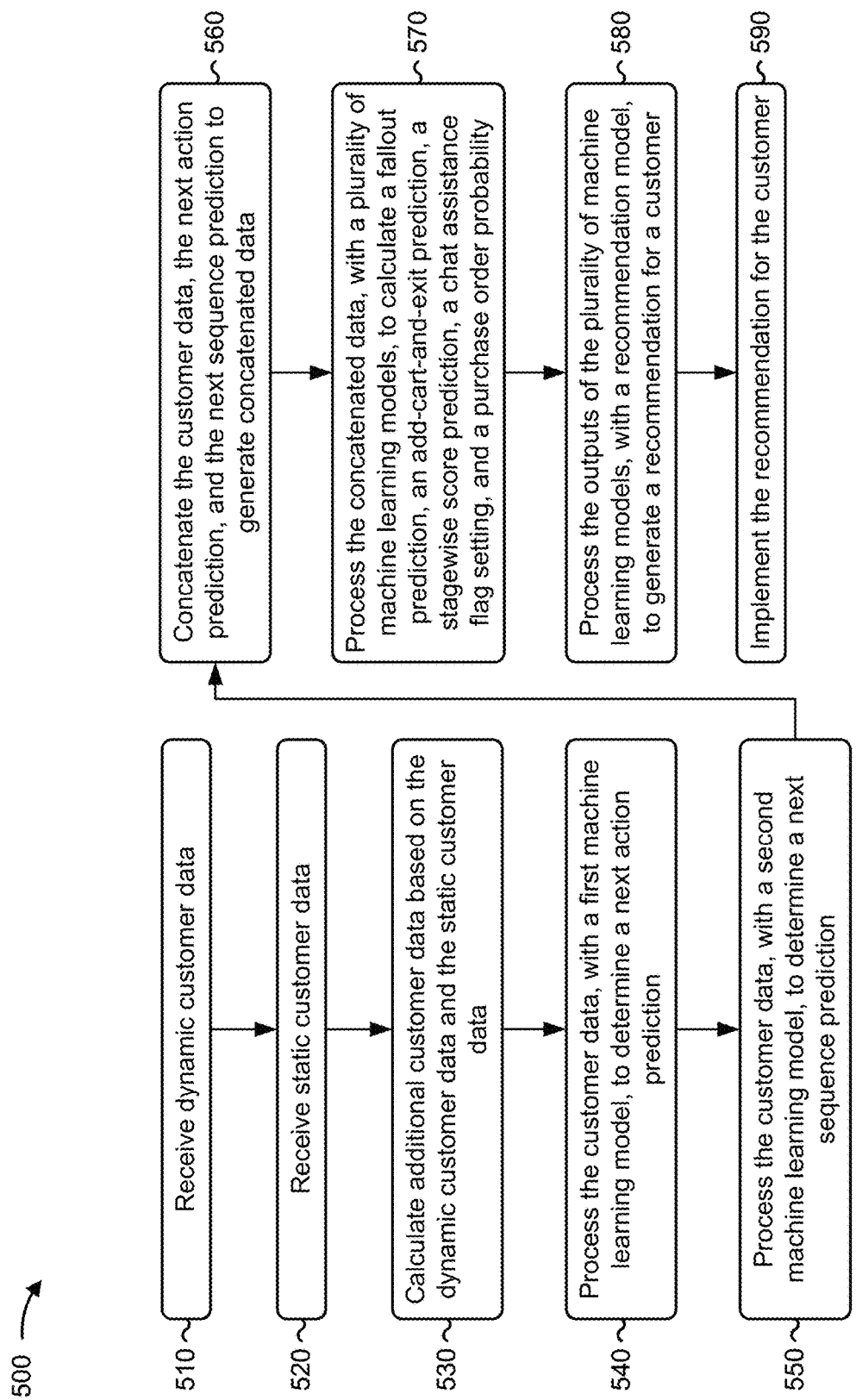
FIG. 5 is a flowchart of an example process for providing customer-behavior-based dynamic enhanced order conversion.

FIG. 5 is a flowchart of an example process 500 for providing customer-behavior-based dynamic enhanced order conversion. In some implementations, one or more process blocks of FIG. 5 may be performed by a device (e.g., the recommendation system 110). In some implementations, one or more process blocks of FIG. 5 may be performed by another device or a group of devices separate from or including the device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving dynamic customer data (block 510). For example, the device may receive dynamic customer data identifying current clickstream data, a time difference between clicks, a review page sentiment, and a chat session sentiment associated with a customer, as described above.

As further shown in FIG. 5, process 500 may include receiving static customer data (block 520). For example, the device may receive static customer data identifying a previous purchased product cost, as described above.

As further shown in FIG. 5, process 500 may include calculating additional customer data based on the dynamic customer data and the static customer data (block 530). For example, the device may calculate additional customer data identifying a buyer interest rate, a purchase cost bucket score, and a quantity of clicks based on the dynamic customer data and the static customer data, as described above. In some implementations, calculating the additional customer data identifying the buyer interest rate includes determining stages of a purchase with the customer, calculating a sum of events found between the stages, identifying a quantity of particular events associated with the purchase, and calculating the buyer interest rate based on the sum of the events and the quantity of the particular events.

In some implementations, calculating the additional customer data identifying the purchase cost bucket score includes calculating the purchase cost bucket score based on whether the customer is associated with data indicating one of a first visit and no previous purchase, multiple previous visits and no previous purchase, or a previous purchase. In some implementations, calculating the additional customer data identifying the quantity of clicks includes identifying paths for purchases associated with the customer, determining average clicks in each path, and calculating the quantity of clicks based on a standard deviation of the average clicks.

As further shown in FIG. 5, process 500 may include processing the customer data, with a first machine learning model, to determine a next action prediction (block 540). For example, the device may process the static customer data, the dynamic customer data, and the additional customer data, with a first machine learning model, to determine a next action prediction, as described above.

As further shown in FIG. 5, process 500 may include processing the customer data, with a second machine learning model, to determine a next sequence prediction (block 550). For example, the device may process the static customer data, the dynamic customer data, and the additional customer data, with a second machine learning model, to determine a next sequence prediction, as described above.

As further shown in FIG. 5, process 500 may include concatenating the customer data, the next action prediction, and the next sequence prediction to generate concatenated data (block 560). For example, the device may concatenate the static customer data, the dynamic customer data, the additional customer data, the next action prediction, and the next sequence prediction to generate concatenated data, as described above.

As further shown in FIG. 5, process 500 may include processing the concatenated data, with a plurality of machine learning models, to calculate a fallout prediction, an add-cart-and-exit prediction, a stagewise score prediction, a chat assistance flag setting, and a purchase order probability (block 570). For example, the device may process the concatenated data, with a plurality of machine learning models, to calculate a fallout prediction, an add-cart-and-exit prediction, a stagewise score prediction, a chat assistance flag setting, and a purchase order probability, as described above. In some implementations, processing the concatenated data, with the plurality of machine learning models, to calculate the fallout prediction, the add-cart-and-exit prediction, the stagewise score prediction, the chat assistance flag setting, and the purchase order probability includes processing the concatenated data, with a third machine learning model, to calculate the fallout prediction; processing the concatenated data, with a fourth machine learning model, to calculate the add-cart-and-exit prediction; processing the concatenated data, with a fifth machine learning model, to calculate the stagewise score prediction; processing the concatenated data, with a sixth machine learning model, to determine the chat assistance flag setting; and processing the concatenated data, with a seventh machine learning model, to determine the purchase order probability.

As further shown in FIG. 5, process 500 may include processing the outputs of the plurality of machine learning models, with a recommendation model, to generate a recommendation for a customer (block 580). For example, the device may process the fallout prediction, the add-cart-and-exit prediction, the stagewise score prediction, the chat assistance flag setting, and the purchase order probability, with a recommendation model, to generate a recommendation for the customer, as described above. In some implementations, when the purchase order probability satisfies a threshold and the chat assistance flag setting is zero, the recommendation is to skip upcoming stages and display a place order menu to the customer. In some implementations, when the purchase order probability satisfies a threshold and the chat assistance flag setting is one, the recommendation is to skip upcoming stages and display a place order menu with a live chat agent to the customer.

In some implementations, when the purchase order probability fails to satisfy a first threshold, the buyer interest rate satisfies a second threshold, the stagewise score prediction satisfies a third threshold, and the chat assistance flag setting is zero, the recommendation is to skip upcoming stages and display a stage page to the customer. In some implementations, when the purchase order probability fails to satisfy a first threshold, the buyer interest rate satisfies a second threshold, the stagewise score prediction satisfies a third threshold, and the chat assistance flag setting is one, the recommendation is to skip upcoming stages and display a stage page with a live chat agent to the customer.

In some implementations, when the purchase order probability fails to satisfy a first threshold, the buyer interest rate satisfies a second threshold, the stagewise score prediction fails to satisfy a third threshold, the fallout prediction satisfies a fourth threshold or the add-cart-and-exit prediction satisfies a fifth threshold, and the chat assistance flag setting is one, the recommendation is to display a next higher probability stage page with a live chat agent to the customer. In some implementations, when the purchase order probability fails to satisfy a first threshold, the buyer interest rate satisfies a second threshold, the stagewise score prediction fails to satisfy a third threshold, the fallout prediction satisfies a fourth threshold or the add-cart-and-exit prediction satisfies a fifth threshold, and the chat assistance flag setting is zero, the recommendation is to display a next page to the customer.

In some implementations, when the purchase order probability fails to satisfy a first threshold, the buyer interest rate satisfies a second threshold, the stagewise score prediction fails to satisfy a third threshold, the fallout prediction fails to satisfy a fourth threshold, and the add-cart-and-exit prediction fails to satisfy a fifth threshold, the recommendation is to display a next page, with an option to navigate for a next best product, to the customer. In some implementations, when the purchase order probability fails to satisfy a first threshold, the buyer interest rate fails to satisfy a second threshold, and the fallout prediction satisfies a third threshold or the add-cart-and-exit prediction satisfies a fourth threshold, or the quantity of clicks satisfies a fifth threshold, the recommendation is to display a next best product to the customer.

As further shown in FIG. 5, process 500 may include implementing the recommendation for the customer (block 590). For example, the device may implement the recommendation for the customer, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, dynamic customer data identifying current clickstream data, a time difference between clicks, a review page sentiment, and a chat session sentiment associated with a customer,
  wherein the dynamic customer data is received, directly or indirectly, from a user device associated with the customer during a time period in which the customer is interacting with a web page,
  wherein the time difference between clicks corresponds to a time period between when the customer selects an item displayed via the web page and when the customer selects another item on the web page, and
  wherein the chat session sentiment indicates a sentiment associated with an interaction between the customer and an agent via the web page;
receiving, by the device, static customer data identifying a previous purchased product cost;
calculating, by the device, additional customer data identifying a buyer interest rate, a purchase cost bucket score, and a quantity of clicks based on the dynamic customer data and the static customer data;
processing, by the device, the static customer data, the dynamic customer data, and the additional customer data, with a first machine learning model, to determine a next action prediction;
processing, by the device, the static customer data, the dynamic customer data, and the additional customer data, with a second machine learning model, to determine a next sequence prediction;
concatenating, by the device, the static customer data, the dynamic customer data, the additional customer data, the next action prediction, and the next sequence prediction to generate concatenated data;
processing, by the device, the concatenated data, with a plurality of machine learning models, to calculate a fallout prediction, an add-cart-and-exit prediction, a stagewise score prediction, a chat assistance flag setting, and a purchase order probability;
displaying, by the device and when the purchase order probability satisfies a threshold and the chat assistance flag setting is one, a place order menu with a live chat agent to the customer;
processing, by the device and when the purchase order probability fails to satisfy the threshold, the fallout prediction, the add-cart-and-exit prediction, the stagewise score prediction, the chat assistance flag setting, and the purchase order probability, with a recommendation model, to generate a recommendation for the customer; and
implementing, by the device and during the time period in which the customer is interacting with the web page, the recommendation for the customer.

2. The method of claim 1, wherein processing the concatenated data, with the plurality of machine learning models, to calculate the fallout prediction, the add-cart-and-exit prediction, the stagewise score prediction, the chat assistance flag setting, and the purchase order probability comprises:
processing the concatenated data, with a third machine learning model, to calculate the fallout prediction;

processing the concatenated data, with a fourth machine learning model, to calculate the add-cart-and-exit prediction;

processing the concatenated data, with a fifth machine learning model, to calculate the stagewise score prediction;

processing the concatenated data, with a sixth machine learning model, to determine the chat assistance flag setting; and processing the concatenated data, with a seventh machine learning model, to determine the purchase order probability.

3. The method of claim 1, wherein calculating the additional customer data identifying the buyer interest rate comprises:
determining stages of a purchase with the customer;
calculating a sum of events found between the stages;
identifying a quantity of particular events associated with the purchase; and
calculating the buyer interest rate based on the sum of the events and the quantity of the particular events.

4. The method of claim 1, wherein calculating the additional customer data identifying the purchase cost bucket score comprises:
calculating the purchase cost bucket score based on whether the customer is associated with data indicating one of:
a first visit and no previous purchase,
multiple previous visits and no previous purchase, or
a previous purchase.

5. The method of claim 1, wherein calculating the additional customer data identifying the quantity of clicks comprises:
identifying paths for purchases associated with the customer;
determining average clicks in each path; and
calculating the quantity of clicks based on a standard deviation of the average clicks.

6. The method of claim 1, wherein, when the purchase order probability satisfies a threshold and the chat assistance flag setting is zero, the recommendation is to skip upcoming stages and display a place order menu to the customer.

7. The method of claim 1, wherein, when the purchase order probability satisfies a threshold and the chat assistance flag setting is one, the recommendation is to skip upcoming stages, wherein the place order menu with the live chat agent is displayed to the customer based on skipping the upcoming stages.

8. A device, comprising:
one or more processors configured to:
receive dynamic customer data identifying current clickstream data, a time difference between clicks, a review page sentiment, and a chat session sentiment associated with a customer,
wherein the dynamic customer data is received, directly or indirectly, from a user device associated with the customer during a time period in which the customer is interacting with a web page,
wherein the time difference between clicks corresponds to a time period between when the customer selects an item displayed via the web page and when the customer selects another item on the web page, and
wherein the chat session sentiment indicates a sentiment associated with an interaction between the customer and an agent via the web page;
receive static customer data identifying a previous purchased product cost;
calculate additional customer data identifying a buyer interest rate, a purchase cost bucket score, and a quantity of clicks based on the dynamic customer data and the static customer data;
process the static customer data, the dynamic customer data, and the additional customer data, with a first machine learning model, to determine a next action prediction;
process the static customer data, the dynamic customer data, and the additional customer data, with a second machine learning model, to determine a next sequence prediction;
concatenate the static customer data, the dynamic customer data, the additional customer data, the next action prediction, and the next sequence prediction to generate concatenated data;
process the concatenated data, with a plurality of different deep learning models, to calculate a fallout prediction, an add-cart-and-exit prediction, a stagewise score prediction, a chat assistance flag setting, and a purchase order probability;
display, when the purchase order probability satisfies a threshold and the chat assistance flag setting is one, a place order menu with a live chat agent to the customer;
process, when the purchase order probability fails to satisfy the threshold, the fallout prediction, the add-cart-and-exit prediction, the stagewise score prediction, the chat assistance flag setting, and the purchase order probability, with a recommendation model, to generate a recommendation for the customer; and
implement, during the time period in which the customer is interacting with the web page, the recommendation for the customer.

9. The device of claim 8, wherein, when the purchase order probability fails to satisfy a first threshold, the buyer interest rate satisfies a second threshold, the stagewise score prediction satisfies a third threshold, and the chat assistance flag setting is zero, the recommendation is to skip upcoming stages and display a stage page to the customer.

10. The device of claim 8, wherein, when the purchase order probability fails to satisfy a first threshold, the buyer interest rate satisfies a second threshold, the stagewise score prediction satisfies a third threshold, and the chat assistance flag setting is one, the recommendation is to skip upcoming stages and display a stage page with a live chat agent to the customer.

11. The device of claim 8, wherein, when the purchase order probability fails to satisfy a first threshold, the buyer interest rate satisfies a second threshold, the stagewise score prediction fails to satisfy a third threshold, the fallout prediction satisfies a fourth threshold or the add-cart-and-exit prediction satisfies a fifth threshold, and the chat assistance flag setting is one, the recommendation is to display a next higher probability stage page with a live chat agent to the customer.

12. The device of claim 8, wherein, when the purchase order probability fails to satisfy a first threshold, the buyer interest rate satisfies a second threshold, the stagewise score prediction fails to satisfy a third threshold, the fallout prediction satisfies a fourth threshold or the add-cart-and-exit prediction satisfies a fifth threshold, and the chat assistance flag setting is zero, the recommendation is to display a next page to the customer.

13. The device of claim 8, wherein, when the purchase order probability fails to satisfy a first threshold, the buyer interest rate satisfies a second threshold, the stagewise score prediction fails to satisfy a third threshold, the fallout prediction fails to satisfy a fourth threshold, and the add-cart-and-exit prediction fails to satisfy a fifth threshold, the recommendation is to display a next page, with an option to navigate for a next best product, to the customer.

14. The device of claim 8, wherein, when the purchase order probability fails to satisfy a first threshold, the buyer interest rate fails to satisfy a second threshold, and the fallout prediction satisfies a third threshold or the add-cart-and-exit prediction satisfies a fourth threshold, or the quantity of clicks satisfies a fifth threshold, the recommendation is to display a next best product to the customer.

15. A non-transitory computer-readable medium storing a set of instructions, the set of instructions comprising:
one or more instructions that, when executed by one or more processors of a device, cause the device to:
receive dynamic customer data identifying current clickstream data, a time difference between clicks, a review page sentiment, and a chat session sentiment associated with a customer,
wherein the dynamic customer data is received, directly or indirectly, from a user device associated with the customer during a time period in which the customer is interacting with a web page,
wherein the time difference between clicks corresponds to a time period between when the customer selects an item displayed via the web page and when the customer selects another item on the web page, and
wherein the chat session sentiment indicates a sentiment associated with an interaction between the customer and an agent via the web page;
receive static customer data identifying a previous purchased product cost;
calculate additional customer data identifying a buyer interest rate, a purchase cost bucket score, and a quantity of clicks based on the dynamic customer data and the static customer data;
process the static customer data, the dynamic customer data, and the additional customer data, with a first machine learning model, to determine a next action prediction;
process the static customer data, the dynamic customer data, and the additional customer data, with a second machine learning model, to determine a next sequence prediction;
concatenate the static customer data, the dynamic customer data, the additional customer data, the next action prediction, and the next sequence prediction to generate concatenated data;
process the concatenated data, with a third machine learning model, to calculate a fallout prediction;
process the concatenated data, with a fourth machine learning model, to calculate an add-cart-and-exit prediction;
process the concatenated data, with a fifth machine learning model, to calculate a stagewise score prediction;
process the concatenated data, with a sixth machine learning model, to determine a chat assistance flag setting;
process the concatenated data, with a seventh machine learning model, to determine a purchase order probability;
display, when the purchase order probability satisfies a threshold and the chat assistance flag setting is one, a place order menu with a live chat agent to the customer;
process, when the purchase order probability fails to satisfy the threshold, the fallout prediction, the add-cart-and-exit prediction, the stagewise score prediction, the chat assistance flag setting, and the purchase order probability, with a recommendation model, to generate a recommendation for the customer; and
implement, during the time period in which the customer is interacting with the web page, the recommendation for the customer.

16. The non-transitory computer-readable medium of claim 15, wherein the one or more instructions, that cause the device to calculate the additional customer data identifying the buyer interest rate, cause the device to:
determine stages of a purchase with the customer;
calculate a sum of events found between the stages;
identify a quantity of particular events associated with the purchase; and
calculate the buyer interest rate based on the sum of the events and the quantity of the particular events.

17. The non-transitory computer-readable medium of claim 15, wherein the one or more instructions, that cause the device to calculate the additional customer data identifying the purchase cost bucket score, cause the device to:
calculate the purchase cost bucket score based on whether the customer is associated with data indicating one of:
a first visit and no previous purchase,
multiple previous visits and no previous purchase, or
a first visit or multiple previous visits and a previous purchase.

18. The non-transitory computer-readable medium of claim 15, wherein the one or more instructions, that cause the device to calculate the additional customer data identifying the quantity of clicks, cause the device to:
identify paths for purchases associated with the customer;
determine average clicks in each path; and
calculate the quantity of clicks based on a standard deviation of the average clicks.

19. The non-transitory computer-readable medium of claim 15, wherein, when the purchase order probability satisfies the threshold and the chat assistance flag setting is zero, the recommendation is to skip upcoming stages, wherein the place order menu is displayed to the customer based on skipping the upcoming stages.

20. The non-transitory computer-readable medium of claim 15, wherein, when the purchase order probability satisfies the threshold and the chat assistance flag setting is one, the recommendation is to skip upcoming stages, wherein the place order menu with the live chat agent is displayed to the customer based on skipping the upcoming stages.

* * * * *